United States Patent
Deo et al.

(10) Patent No.: US 11,873,243 B2
(45) Date of Patent: Jan. 16, 2024

(54) INHIBITION OF SILICA SCALE USING BOTTLE BRUSH POLYMERS

(71) Applicants: Dow Global Technologies LLC, Midland, MI (US); Rohm and Haas Company, Collegeville, PA (US)

(72) Inventors: Puspendu Deo, Pearland, TX (US); Graham P. Abramo, Penllyn, PA (US); Kaylie L. Young, Sugar Land, TX (US); Somil Chandrakant Mehta, Mumbai (IN)

(73) Assignees: DOW GLOBAL TECHNOLOGIES LLC, Midland, MI (US); ROHM AND HAAS COMPANY, Collegeville, PA (US)

( * ) Notice: Subject to any disclaimer, the term of this patent is extended or adjusted under 35 U.S.C. 154(b) by 428 days.

(21) Appl. No.: 15/734,096

(22) PCT Filed: May 29, 2019

(86) PCT No.: PCT/US2019/034335
§ 371 (c)(1),
(2) Date: Dec. 1, 2020

(87) PCT Pub. No.: WO2019/232011
PCT Pub. Date: Dec. 5, 2019

(65) Prior Publication Data
US 2021/0155520 A1    May 27, 2021

(30) Foreign Application Priority Data

Jun. 1, 2018  (IN) .............................. 201841020613
Aug. 6, 2018  (IN) .............................. 201841029480

(51) Int. Cl.
*C02F 5/10*    (2023.01)
*C08F 220/06*    (2006.01)
(Continued)

(52) U.S. Cl.
CPC .............. *C02F 5/10* (2013.01); *C08F 220/06* (2013.01); *C08F 220/286* (2020.02); *C02F 2303/22* (2013.01); *C08F 220/585* (2020.02)

(58) Field of Classification Search
None
See application file for complete search history.

(56) References Cited

U.S. PATENT DOCUMENTS

| | | |
|---|---|---|
| 4,435,556 A | 3/1984 | Masler, III |
| 4,566,974 A | 1/1986 | Masler, III et al. |
| | (Continued) | |

FOREIGN PATENT DOCUMENTS

| | | |
|---|---|---|
| JP | 2004027060 | 1/2001 |

OTHER PUBLICATIONS

PCT/US2019/034335, International Search Report and Written Opinion dated Dec. 5, 2019.

(Continued)

*Primary Examiner* — Clare M Perrin (57) ABSTRACT

A method for inhibiting silica scale formation which treats aqueous systems containing silica with a bottle brush polymer. The bottle brush polymer includes a repeat unit obtained after polymerization of one or more anionic monomers, and a repeat unit obtained after polymerization of one or more polyoxoalkylene-containing monomers. The bottle brush polymer may further include a repeat unit obtained after polymerization of one or more nonionic monomers. The addition of the bottle brush polymer to the aqueous system results in the inhibition of silica scale.

11 Claims, 1 Drawing Sheet

(51) Int. Cl.
*C08F 220/28* (2006.01)
*C08F 220/58* (2006.01)

(56) References Cited

U.S. PATENT DOCUMENTS

| | | | |
|---|---|---|---|
| 4,618,448 A | | 10/1986 | Cha et al. |
| 4,711,725 A | | 12/1987 | Amick et al. |
| 4,933,090 A | | 6/1990 | Gill et al. |
| 5,180,498 A | | 1/1993 | Chen et al. |
| 5,271,847 A | | 12/1993 | Chen et al. |
| 5,445,758 A | * | 8/1995 | Chen ............... C23F 11/08 210/698 |
| 5,527,468 A | | 6/1996 | Boyette et al. |
| 6,051,142 A | | 4/2000 | Roe |
| 7,316,787 B2 | | 1/2008 | Dendel et al. |
| 9,382,444 B2 | | 7/2016 | Trefonas, III et al. |
| 2007/0073015 A1 | | 3/2007 | Sakamoto et al. |
| 2009/0294374 A1 | | 12/2009 | Gill et al. |
| 2012/0161068 A1 | * | 6/2012 | Greene ............... C23F 14/02 252/180 |
| 2015/0166702 A1 | * | 6/2015 | Debling ............... C08F 265/06 526/318.4 |

OTHER PUBLICATIONS

PCT/US2019/034335, International Preliminary Report on Patentability dated Dec. 1, 2020.

Qian Jianhua, Chemistry of Fine Chemicals, 2010, p. 119, Northeastern University Press.

Sun Xubing, et al., Journal of Neijiang Normal College, 2011, Study on the Scale Inhibition Performance of Acrylic Acid/Polyethylene Glycol Monomethyl Ether Acrylate Dimer Copolymer.

* cited by examiner

INHIBITION OF SILICA SCALE USING BOTTLE BRUSH POLYMERS

CROSS-REFERENCE

This application claims priority to Indian Patent Application No. 201841020613, filed on Jun. 1, 2018; and Indian Patent Application No. 201841029480, filed Aug. 6, 2018.

FIELD OF THE INVENTION

This invention relates to scale inhibition. Specifically, this invention relates to the use of bottle brush polymers to inhibit the formation of silica scales.

BACKGROUND OF THE INVENTION

A "bottle brush" type polymer is a polymer or copolymer where a portion of the polymeric chain backbone has branches grafted onto it that extend radially in all directions. Bottle brush polymers are disclosed in, inter alia, U.S. Pat. No. 9,382,444, which is incorporated herein by reference in its entirety.

Silica and metal silicate scales are problematic in many industries utilizing aqueous systems. The segments most impacted are industrial water treating, specifically reverse osmosis (RO), cooling towers, boilers, and oil and gas applications, in particular geothermal energy harvesting and steam assisted gravity drainage (SAGD) applications. Mining operations, such as alumina refining utilizing the Bayer process, also have significant issues with silica and silicate scales.

Silica and silicate scale formation is dependent on operating conditions such as pH, temperature, silica concentration, and the presence of polyvalent metal ions present in the water used in such systems. Based on those conditions, different types of silica or silicate scales may form. For example, at pH values above 8.5, silica scale is predominantly in the form of metal silicates, depending on the presence of multivalent ions such as $Mg^{2+}$, $Ca^{2+}$, $Al^{3+}$, or $Fe^{3+}$ and operation temperature, whereas colloidal silica (polymerized silica particles) is more common at pH values between 6.5 and 8.5. The scales can deposit on the water treatment or production equipment and ultimately restrict flow, leading to costly process downtime. Typical scale removal treatments involve mechanical cleaning or hazardous and corrosive acid washes, such as hydrofluoric acid washes.

Silica scale inhibitors known in the art include, for example, U.S. Published Pat. Application No. 2009/0294374A1, which discloses the use as a silica scale inhibitor of a water soluble polymer made from 0-5 mole % of a monomer (i.e. acrylic acid, 2-acrylamido-2-methylpropane sulfonic acid, acrylamide) and 95-100 mole % of a polyoxoalkylene-containing (meth) acrylate monomer. U.S. Pat. No. 4,566,974 discloses a method for inhibiting the deposition of scale using polymers made with acrylic acid/methacrylic acid, acrylamide/methacrylamide, and (meth) acrylic ester with 2-6 ethylene oxide units on each ester. U.S. Pat. No. 4,618,448 discloses the use of copolymers of 35-90% by weight unsaturated carboxylic acid or its salt, 5-40% unsaturated sulfonic acid or its salt, and 5-40% by weight of unsaturated polyalkylene oxide as scale inhibitors. U.S. Pat. No. 4,933,090 discloses the use of a select phosphonate and optionally a carboxylic/sulfonic/polyalkylene oxide polymer to control silica/silicate deposition. U.S. Pat. Nos. 5,180,498 and 5,271,847 disclose a method for controlling silica deposition in an aqueous medium under steam generating conditions with a water soluble polymer containing allyl polyethylene glycol. U.S. Pat. Nos. 5,445,758 and 5,527,468 disclose a composition for controlling the deposition of scale imparting species on the structural surfaces of steam generating systems. U.S. Pat. No. 6,051,142 discloses the use of an ethylene oxide-propylene oxide (EO-PO) block copolymer to control silica and silicate scales in cooling and boiler water systems. Finally, U.S. Pat. No. 7,316,787 discloses the use of hydrophobically modified ethylene oxide polymers as colloidal silica scale inhibitors.

Despite the development of new scale inhibitors, silica scaling continues to be a major challenge in aqueous systems, thus demonstrating the need for polymers with scale inhibition performance beyond those known in the art.

SUMMARY OF THE INVENTION

In accordance with one aspect of the invention, there is provided a method of inhibiting silica scale formation via treating an aqueous system containing silica with an effective amount of polymer having the chemical formula:

where "A" is the repeat unit obtained after the polymerization of one or more anionic monomers selected from the group consisting of carboxylic acids, carboxylates, sulfonic acids, sulfonates, acrylic phosphates, and mixtures thereof, and preferably comprises approximately 5 wt. %-approximately 45 wt. % of the polymer, and more preferably approximately 5 wt. %-approximately 30 wt. % of the polymer. Separately "B" is the repeat unit obtained after the polymerization of one or more polyoxoalkylene-containing monomers having the chemical formula:

wherein $R_1$ is H or $CH_3$. $R_2$ has the chemical formula:

wherein $R_3$ is H, $CH_3$, or mixtures thereof, and $R_4$ is H, or a $C_1$ through $C_4$ alkyl group, or mixtures thereof, and n has a value between 5-100. "B" preferably comprises approximately 55 wt. %-approximately 95 wt. % of the polymer, and more preferably approximately 70 wt. %-approximately 95 wt. %. Finally, C is the repeat unit obtained after polymerization of one or more nonionic monomers selected from the group consisting of methacrylates, acrylates, and acrylamides. "C" preferably comprises approximately 0 wt. % to approximately 25 wt. % of the bottle brush polymer.

The disclosed invention covers the use of novel bottle brush copolymers of one or more anionic monomers in combination with one or more polyoxoalkylene-containing monomers of varying molecular weight, or bottle brush copolymers of a polyoxoalkylene-containing monomer and either two or more anionic monomers, or an anionic monomer and nonanionic monomer. Preferred anionic monomers include, but are not limited to carboxylic acids, carboxylates, sulfonic acids, sulfonates, and acrylic phosphates, while preferred polyoxoalkylene-containing monomers include, but are not limited to polyoxoalkylene acrylates and methacrylates. Preferred nonionic monomers include, but are not limited to methyl methacrylate, ethyl acrylate, hydroxy ethyl methacrylate hydroxy propyl acrylate and cellosolve acrylate, (meth)acrylamide, N-methyl acrylamide, N,N-dimethylacrylamide, N-isopropyl acrylamide, N-t-butyl acrylamide, N,N-dimethylaminoethyl (meth)acrylate, t-butyl acrylamide, t-octyl acrylamide and dimethylacrylamide. These systems can be used in applications such as reverse osmosis (RO), cooling tower, geothermal, and SAGD applications.

With the instant invention a preferred silica scale inhibitor can be prepared by polymerizing acrylic acid (AA), methacrylic acid (MAA) and/or 2-acrylamido-2-methylpropane sulfonic acid (AMPS) with polyethylene glycol methyl ether methacrylate (MPEGMA) to form bottle brush copolymers or ter-polymers with an MPEGMA weight fraction of more than 45%. Alternatively a preferred silica scale inhibitor can be prepared by polymerizing MAA and methyl methacrylate (MMA) with MPEGMA to form bottle brush ter-polymers with an MPEGMA weight fraction of more than 45%. It has been determined that bottle brush polymers such as these exhibit significant silica scale inhibition properties.

DETAILED DESCRIPTION OF THE PREFERRED EMBODIMENTS

The disclosed invention covers a method of inhibiting silica scale formation via treating an aqueous system containing silica with an effective amount of polymer having the chemical formula:

where "A" is the repeat unit obtained after the polymerization of one or more anionic monomers selected from the group consisting of a carboxylic acid, a carboxylate, a sulfonic acid, a sulfonate, a phosphonic acid, a phosphate, an acrylic phosphate, and mixtures thereof "A" preferably comprises approximately 5 wt. %-approximately 45 wt. % of the polymer, and more preferably comprise approximately 5 wt. %-approximately 30 wt. % of the polymer. Separately "B" is the repeat unit obtained after the polymerization of one or more polyoxoalkylene-containing monomers having chemical formula:

wherein $R_1$ is H or $CH_3$. $R_2$ has the chemical formula:

wherein $R_3$ is H, $CH_3$, or mixtures thereof, and $R_4$ is H, or a $C_1$ through $C_4$ alkyl group, or mixtures thereof, and n has a value between 5-100. "B" preferably comprises approximately 55 wt. %-approximately 95 wt. % of the polymer, and more preferably 70 wt. %-approximately 95 wt. % of the polymer. Finally, C is the repeat unit obtained after polymerization of one or more nonionic monomers selected from the group consisting of methacrylates, acrylates, and acrylamides. "C" preferably comprises approximately 0 wt. %-approximately 25 wt. % of the bottle brush polymer.

All percentages stated herein are weight percentages (wt. %), unless otherwise indicated. Temperatures are in degrees Celsius (° C.), and "ambient temperature" means between 20° C. and 25° C., unless specified otherwise.

"Polymer" generally refers to a polymeric compound or "resin" prepared by polymerizing monomers, whether of the same or different types. As used herein, the generic term "polymer" includes polymeric compounds made from one or more types of monomers. "Copolymers" as used herein generally refers to polymeric compounds prepared from two or more different types of monomers. Similarly "ter-polymers" are polymeric compounds prepared from three different types of monomers.

"Aqueous system" generally refers to any system containing water including, but not limited to, silica brine, cooling water, desalination, filtration, reverse osmosis, sugar evaporators, paper processing, mining circuits, geothermal energy systems, SAGD, and the like.

The term "silica scale" generally refers to solid materials containing silica that are deposited and accumulated on internal surfaces of water treatment equipment such as RO membranes, heat exchangers, and production tubing and piping. Silica scale generally includes multiple types of silica scale such as colloidal or amorphous silica ($SiO_2$) and silicate (such as magnesium silicate). The accumulated silica scale may be, and sometimes is, a combination of silica and silicate types of scale, often where one or the other type of scale predominates. Colloidal/amorphous silica scale is the term used hereinafter to generally refer to silica scale deposits that are predominantly of the colloidal/amorphous type. Other kinds of scale besides the silica types may be present, such as calcium carbonate, calcium sulfate, calcium phosphate, calcium phosphonate, calcium oxalate, barium sulfate, alluvial deposits, metal oxide, and metal hydroxide, depending upon what kinds of metals and other ions are present in the aqueous system.

The chemical reaction mechanism for formation of colloidal/amorphous silica scale generally involves condensation polymerization of silicic acid, catalyzed by hydroxide ions. This reaction mechanism proceeds generally as follows:

(I)

(II)

(III)

Since the reaction mechanism is catalyzed by hydroxide ions, it proceeds slowly at low pH, but increases significantly above pH of about 7. Thus, prevention of silica scale formation in aqueous systems having "neutral" pH, such as, between 6.5 and 8.5, is of particular concern.

The method of the present invention is suitable for controlling deposition of colloidal/amorphous silica scale in aqueous systems having a pH between 6.0 and 10.0, at temperatures ranging from 20° C. to 250° C. The method comprises adding to the aqueous system an effective amount of bottle brush polymer comprising a repeat unit obtained after polymerization of one or more anionic monomers, a repeat unit obtained after polymerization of one or more polyoxoalkylene-containing monomers, and a repeat unit obtained after the polymerization of one or more nonionic monomers.

Bottle Brush Polymers

Bottle brush polymers are a type of branched or graft polymer comprising two or more polymers, with polymeric side-chain "bristles" attached to a linear polymer "backbone," such that their appearance resembles that of a bottle brush. Bottle brush polymers desirable for the present invention have the following chemical formula:

Wherein A is the repeat unit obtained after polymerization of one or more anionic monomers, B is the repeat unit obtained after polymerization of one or more polyoxoalkylene-containing monomers, and C is the repeat unit obtained after polymerization of one or more nonionic monomers. Preferably the one or more anionic monomers comprise approximately 5 wt. %-approximately 45 wt. % of the bottle brush polymer, such that x=approximately 5 wt. %-approximately 45 wt. %. More preferably, the one or more anionic monomers comprise approximately 5 wt. %-approximately 30 wt. % of the bottle brush polymer, such that x=approximately 5 wt. %-approximately 30 wt. %. Preferably the polyoxoalkylene-containing monomer comprises approximately 55 wt. %-approximately 95% of the bottle brush polymer, such that y=approximately 55 wt. %-approximately 95 wt. %. More preferably the polyoxoalkylene-containing monomer comprises approximately 70 wt. %-approximately 95 wt. % of the bottle brush polymer, such that y=approximately 70 wt. %-approximately 95 wt. %. Finally, the one or more nonionic monomers preferably comprise approximately 0 wt. %-approximately 25 wt. % of the bottle brush polymer, such that z=approximately 0 wt. %-approximately 25 wt. %.

Preferably the bottle brush polymers of the present invention have a number average molecular weight of approximately 2000 Daltons to approximately 60000 Daltons.

Polyoxoalkylene-Containing Monomers

The repeat unit obtained after polymerization of polyoxoalkylene-containing monomers suitable for the present invention has the following chemical formula:

wherein $R_1$ is H or $CH_3$;
wherein $R_2$ has the chemical formula:

wherein $R_3$ is H, $CH_3$, or mixtures thereof;
wherein $R_4$ is H, or a $C_1$ through $C_4$ alkyl group, or mixtures thereof; and
wherein n=5-100.

Suitable polyoxoalkylene-containing monomers include, but are not limited to polyoxoalkylene acrylates and methacrylates such as polyethylene glycol methacrylate, polyethylene glycol acrylate, polyethylene glycol methyl ether methacrylate, and polyethylene glycol methyl ether acrylate.

Anionic Monomers

Anionic monomers act as dispersants in the presence of the typical cations found in aqueous solutions such as calcium, magnesium, iron, and aluminum. Preferred anionic monomers that may be used to synthesize the present bottle brush polymer include but are not limited to unsaturated carboxylic acids, unsaturated sulfonic acids, unsaturated phosphonic acids, unsaturated phosphates, and unsaturated acrylic phosphates. Preferred unsaturated carboxylic acids include but are not limited to acrylic acid, methacrylic acid, itaconic acid, and maleic acid. Preferred unsaturated sulfonic acids or salts include but are not limited to 2-acrylamido-2-methylpropylsulfonic acid (AMPS), 2-methacrylamido-2-methylpropylsulfonic acid, styrene sulfonic acid, and vinylsulfonic acid. Preferred unsaturated acrylic phosphates include but are not limited to ethylene glycol methacrylate phosphate.

Nonionic Monomers

Preferred nonionic monomers that may be used to synthesize the present bottle brush polymer include but are not limited to methacrylates, acrylates, and acrylamides. Preferred methacrylates include but are not limited to methyl methacrylate, N,N-dimethylaminoethyl (meth)acrylate, and hydroxy ethyl methacrylate. Preferred acrylates include ethyl acrylate, hydroxy propyl acrylate and cellosolve acrylate. Preferred acrylamides include (meth)acrylamide, N-methyl acrylamide, N,N-dimethylacrylamide, N-isopropyl acrylamide, N-t-butyl acrylamide, t-butyl acrylamide, t-octyl acrylamide and dimethylacrylamide.

Method of Use

"Effective amount" is that amount of the bottle brush polymer necessary to inhibit deposition of colloidal/amorphous silica scale in the aqueous system being treated. "Inhibit" means to retard the deposition of colloidal/amorphous silica scale to prolong period of maximal efficiency of equipment. The effective amount of bottle brush polymer added to the aqueous system may vary depending upon the temperature and pH of the aqueous system along with the concentration of silica, salts and polyvalent metal ions present in the aqueous system. In most applications, the effective amount of bottle brush polymer ranges from about 0.5 ppm to about 1000 ppm, and more preferably from about 1 ppm to 100 ppm. The aqueous systems treated by the present bottle brush polymer typically have a silica content of more than 30 ppm, 50 ppm or even 100 ppm.

The method of polymerization employed to prepare the bottle brush polymers useful in the method of the present invention for controlling deposition is not particularly limited and may be any method known, now or in the future, to persons of ordinary skill including, but not limited to, emulsion, solution, addition and free-radical polymerization techniques, including the methods of polymerization disclosed in U.S. Pat. No. 4,711,725, which is hereby incorporated by reference in its entirety. Preferably, the bottle brush polymer of the present invention is polymerized via aqueous solution free radical polymerization.

The use, application and benefits of the present invention will be clarified by the following discussion and description of exemplary embodiments of the present invention.

EXAMPLES

The following Examples illustrate various nonlimiting embodiments of the invention disclosed and claimed herein as well as certain attributes thereof.

Example 1

Polymerization

Deionized water (271.5 g), sodium metabisulfite (2 g), and iron sulfate heptahydrate (2.4 mg) were added to a 2 liter, 4 necked round bottom glass reactor fitted with a stirrer, a thermocouple, $N_2$ inlet, and a reflux condenser. The contents of the reactor were heated to 72° C. under a nitrogen atmosphere with stirring. Sodium metabisulfite solution (10 g dissolved in 15.6 g of deionized water), sodium persulfate solution (2.6 g dissolved in 33 g of deionized water), and the monomer mix containing deionized water (159.7 g), acrylic acid (66 g), and 2000 molecular weight polyethylene glycol methyl ether methacrylate (264 g) were each added concurrently to the reactor over 120 minutes. A second charge of sodium persulfate solution (0.61 g in 2.72 g of deionized water) was added to the reactor after the completion of monomer feeds and the reactor was held at 60° C. for 5 minutes. While maintaining the temperature at 60° C. 50% sodium hydroxide solution in water (29.8 g) was added slowly to the reactor to partially neutralize the polymer. Deionized water (82 g) was added to afford a polymer solution that was 35% solids. The polymer solution was cooled to room temperature and collected.

Static Bottle Tests

Static bottle testing was used to evaluate the efficacy of various polymers to inhibit silica polymerization. Free silica remaining in solution (reactive silica) was tracked using the HACH silicomolybdate colorimetric method. Polymers with higher efficacy at inhibiting colloidal silica formation maintained higher levels of free silica in solution over time. Supersaturated silica solutions were prepared by dissolving sodium silicate salt in deionized water to yield an initial silica concentration of 400 ppm as $SiO_2$.

In the first set of static bottle tests, 25 ppm (as actives) of the inhibitor of the invention was dosed into the supersaturated silica solution and the pH was adjusted to 7.5. The samples were then allowed to sit undisturbed for 21 hours at 20° C. After 21 hours, the silica solutions were analyzed for turbidity with a turbidimeter to check for the presence of insoluble precipitates. The silica samples were then filtered with 0.45 μm filters and the filtrate was analyzed using the HACH colorimetric method. Samples A-C are copolymers of acrylic acid (AA) and polyethylene glycol methyl ether methacrylate with a number average molecular weight of 2000 (MPEGMA-2000). Samples A, B, and C contain 30, 40, and 70 wt. % MPEGMA-2000, respectively. Sample D is a homopolymer of MPEGMA-2000. Polyethylene glycol (PEG) polymers with molecular weights of 1450, 3350, and 4600 Daltons were also evaluated for comparison.

After final soluble silica concentrations of the solutions containing the inhibitor and the solutions lacking the inhibitor were measured, the percent scale inhibition was calculated according to the following formula:

$$\frac{\text{Final silica concentration with inhibitor} - \text{Final silica concentration without inhibitor}}{\text{Initial silica concentration} - \text{Final silica concentration without inhibitor}} * 100$$

The results of the turbidity and silica inhibition tests are summarized in Table 1:

TABLE 1

|  | Blank | Sample A | Sample B | Sample C | Sample D | PEG 1450 | PEG 3350 | PEG 4600 |
| --- | --- | --- | --- | --- | --- | --- | --- | --- |
| Soluble Silica @ t = 21 h (ppm) | 190 | 180 | 200 | 300 | 300 | 220 | 280 | 310 |
| Percent Inhibition @ t = 21 h | 0 | −6 | 6 | 65 | 65 | 18 | 53 | 71 |
| Turbidity @ t = 21 h (NTU) | 0.2 | 0.2 | 0.2 | 0.1 | 15.1 | 5.1 | 13.2 | 16.8 |

Sample C maintained a higher level of reactive silica in solution without forming insoluble precipitates, or flocs, that are common with other effective silica inhibition polymers. In comparison, Sample D and the PEG polymers exhibited inhibition of colloidal silica, but resulted in insoluble flocs that greatly increase the turbidity of the silica brine.

In a second set of static bottle tests, 120 ppm of $Ca^{2+}$, added as calcium chloride dihydrate, and 73 ppm of $Mg^{2+}$, added as magnesium chloride hexahydrate, were added in addition to 400 ppm $SiO_2$, added as sodium silicate, to evaluate the effect of hardness ions. After the addition of the inhibitor at 25 ppm as actives, the pH of the brine was adjusted to 7.5. The samples were then allowed to sit undisturbed for 21 hours at 20° C. After 21 hours, the silica solutions were filtered with 0.45 μm filters and the filtrate was analyzed using the HACH colorimetric method. Samples E, F, and G are copolymers of acrylic acid and MPEGMA-2000 containing 30, 60 and 70 wt. %

MPEGMA-2000, respectively. Sample H is a ter-polymer of 7 wt. % AA, 3 wt. % 2-acrylamido-2-methylpropane sulfonic acid (AMPS), and 90 wt. % MPEGMA-2000. The results are shown in Table 2:

TABLE 2

|  | Blank | Sample E | Sample F | Sample G | Sample H |
|---|---|---|---|---|---|
| Soluble Silica @ t = 21 h (ppm) | 180 | 235 | 290 | 300 | 315 |
| % Inhibition @ t = 21 h | 0 | 26 | 52 | 57 | 62 |

Samples F-H show good silica inhibition performance in the presence of hardness ions such as Ca and Mg.

In a third set of static bottle tests, the effect of the molecular weight of the MPEGMA component of the invention was evaluated. 120 ppm of $Ca^{2+}$, added as calcium chloride dihydrate, and 73 ppm of $Mg^{2+}$, added as magnesium chloride hexahydrate, were added in addition to 400 ppm $SiO_2$, added as sodium silicate. After the addition of the inhibitor at 25 ppm as actives, the pH of the brine was adjusted to 7.5. The samples were then allowed to sit undisturbed for 21 hours at 20° C. After 21 hours, the silica solutions were filtered with 0.45 μm filters and the filtrate was analyzed using the HACH colorimetric method. Sample I is a ter-polymer of 27 wt. % AA, 13 wt. % AMPS, and 60 wt. % polyethylene glycol methyl ether methacrylate with a number average molecular weight of 300 (MPEGMA-300). Sample J is a copolymer of 20 wt. % AA and 80 wt. % MPEGMA-300. Sample K is a copolymer of 40 wt. % AA and 60 wt. % polyethylene glycol methyl ether methacrylate with a number average molecular weight of 950 (MPEGMA-950). Sample L is a copolymer of 20 wt. % AA and 80 wt. % MPEGMA-950. Sample M is a copolymer of 40 wt. % AA and 60 wt. % MPEGMA-2000. Sample N is a ter-polymer of 14 wt. % AA, 6 wt. % AMPS, and 80 wt. % MPEGMA-2000. The results are summarized in Table 3.

TABLE 3

|  | Blank | Sample I | Sample J | Sample K | Sample L | Sample M | Sample N |
|---|---|---|---|---|---|---|---|
| Soluble Silica @ t = 21 h (ppm) | 170 | 190 | 220 | 270 | 300 | 280 | 305 |
| % Inhibition @ t = 21 h | 0 | 10 | 24 | 48 | 62 | 52 | 64 |

The data above shows superior silica inhibition for polymers containing higher molecular weight MPEGMA and a higher weight percent of MPEGMA within the range evaluated.

Reverse Osmosis Flat Sheet Tests

Figure 1:
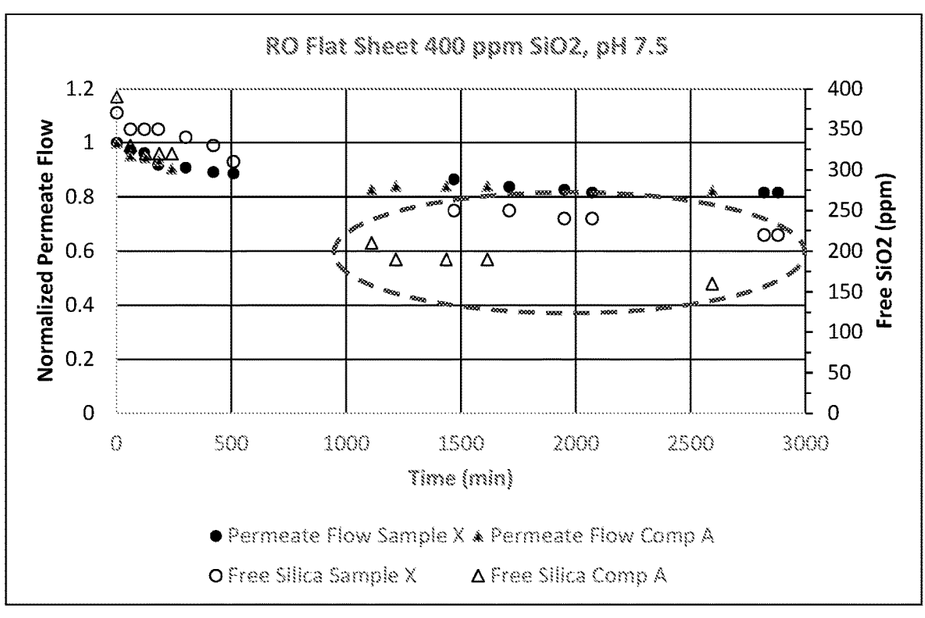
FIG. 1 is a graph depicting the results of reverse osmosis flat sheet tests showing the normalized permeate flow and free silica remaining in the feed tank over time for Sample X compared with an industry standard for inhibiting silica scale (Comp A).

Since colloidal silica is one of the most common foulants for reverse osmosis (RO) membranes, RO flat sheet laboratory tests were also conducted with the inhibitors. 20 ppm (based on actives) of inhibitor was added to 10 L of synthetic brine containing 400 ppm $SiO_2$ added as sodium silicate salt and the pH was adjusted to 7.5. The 10 L of brine was then recycled through a Sterlitech Flat Sheet RO unit for approximately 48 hours. The permeate flow rate and the free silica concentration of the feed tank solution were measured regularly throughout the 48 hours using a graduated cylinder and the HACH silicomolybdate colorimetric method, respectively. The RO unit was run at a feed flow rate of 5.48 liters per minute at room temperature at a pressure of 25 bar. The membranes used were Dow FILMTEC™ BW-30 membranes conditioned with water for 12 hours prior. Sample X is a copolymer containing 20 wt. % AA and 80 wt. % polyethylene glycol methyl ether methacrylate with a number average molecular weight of 300 (MPEGMA-300). Comp A is an industry standard inhibitor for silica scale. FIG. 1 shows the results of the RO flat sheet tests. FIG. 1 shows that Sample X allows a higher amount of silica to remain dispersed in solution over time (circled in FIG. 1) by preventing it from precipitating out compared to Comp A under conditions relevant to RO applications.

Example 2

Polymerization

Propylene Glycol (354 g) was added to a 3 liter, 4 necked round bottom glass reactor fitted with a stirrer, a thermocouple, $N_2$ inlet, and a reflux condenser. The contents of the reactor were heated to 92° C. under a nitrogen atmosphere while stirring. A solution of sodium phosphate dibasic (2.46 g) dissolved in deionized water (10 g) was added to the reactor followed by mercaptoethanol (6.6 g). A monomer mix containing Bisomer 550 MW (470.3 g), methyl methacrylate (138.7 g), and methacrylic acid (45.5 g) was added to the reactor over 240 minutes. An initiator feed of Trigonox 25 C75 (89.6) dissolved in propylene glycol (90 g) was added to the reactor starting at the same time as the monomer mixture and fed over 250 minutes. During feeds the reactor temperature was controlled at 91° C. while continuing stirring. After the completion of initiator feeds the batch was held at 90° C. for 20 minutes. A mixture of ammonium hydroxide solution in water (16.5 g, 30%) and deionized water (285 g) was added to the reactor to raise the pH to 7.0. A solution of Trigonox 25 C75 (52.8 g) in deionized water (53 g) was added to the reactor. A solution of Sodium Metabisulfite (23.6 g) in deionized water (70 g) was added to the reactor, and the batch was held at 90° C. for 45 minutes. A final dilution of deionized water (175 g) was added to the batch, and the batch was cooled to room temperature and collected.

Static Bottle Tests

Static bottle testing was used to evaluate the efficacy of polymers to inhibit silica polymerization. Free silica remaining in solution (reactive silica) was tracked using the HACH silicomolybdate colorimetric method. Polymers with higher efficacy at inhibiting colloidal silica formation maintained higher levels of free silica in solution over time. Supersaturated silica solutions were prepared by dissolving sodium silicate salt in deionized water to yield an initial silica concentration of 400 ppm as $SiO_2$.

In the first set of static bottle tests, 10 and 25 ppm (as actives) of the inhibitor of the invention were dosed into the supersaturated silica solution and the pH was adjusted to 7.5. The samples were then allowed to sit undisturbed for 24 hours at 20° C. After 24 hours, the silica solutions were analyzed for turbidity with a turbidimeter to check for the presence of insoluble flocs. The silica samples were then filtered with 0.45 μm filters and the filtrate was analyzed using the HACH colorimetric method. Sample 1 is a terpolymer of 7 wt. % methacrylic acid (AA), 21 wt. % methyl methacrylate and 72 wt. % polyethylene glycol methyl ether methacrylate with a number average molecular weight of 550 (MPEGMA-550). Sample 2 is a homopolymer of polyethylene glycol methyl ether methacrylate with a number average molecular weight of 300 (MPEGMA-300).

After final soluble silica concentrations of the solutions containing the inhibitor and the solutions lacking the inhibitor were measured, the percent scale inhibition was calculated according to the following formula:

$$\frac{\text{Final silica concentration with inhibitor} - \text{Final silica concentration without inhibitor}}{\text{Initial silica concentration} - \text{Final silica concentration without inhibitor}} * 100$$

The results of the turbidity and silica inhibition tests are summarized in Table 4.

TABLE 4

|  | Blank | Sample 1 | | Sample 2 | |
|---|---|---|---|---|---|
|  |  | 10 ppm | 25 ppm | 10 ppm | 25 ppm |
| Soluble silica @ t = 24 hrs | 190 | 230 | 270 | 240 | 280 |
| Percent inhibition @ t = 24 hrs | 0 | 24 | 47 | 29 | 53 |
| Turbidity @ t = 24 hrs (NTU) | 0.5 | 0.4 | 0.6 | 13 | 18 |

Sample 1 maintained a higher level of reactive silica in solution without forming insoluble precipitates, or flocs. In comparison, Sample 2 exhibited inhibition of colloidal silica, but resulted in insoluble flocs that greatly increase the turbidity of the silica brine.

In a second set of static bottle tests, 100 ppm of Ca', added as calcium chloride dihydrate, and 40 ppm of $Mg^{2+}$, added as magnesium chloride hexahydrate, were added in addition to 400 ppm $SiO_2$, added as sodium silicate nonahydrate to evaluate the effect of hardness ions. After the addition of the inhibitor at 10 and 25 ppm (as actives) the brine pH was adjusted to 7.5. The samples were then allowed to sit undisturbed for 24 hours at 20° C. After 24 hours, the silica solutions were analyzed for turbidity with a turbidimeter to check for the presence of insoluble flocs. The silica samples were then filtered with 0.45 μm filters and the filtrate was analyzed using the HACH colorimetric method. Sample 3 is a terpolymer of 7 wt. % methacrylic acid (AA), 21 wt. % methyl methacrylate and 72 wt. % polyethylene glycol methyl ether methacrylate with a number average molecular weight of 550 Daltons (MPEGMA-550). The results of silica inhibition tests are summarized in Table 5.

TABLE 5

|  | Blank | Sample 3 | |
|---|---|---|---|
|  |  | 10 ppm | 25 ppm |
| Soluble silica @ t = 24 hrs | 180 | 220 | 270 |
| Percent inhibition @ t = 24 hrs | 0 | 24 | 53 |

The data above shows that the inhibitor (e.g. Sample 3) maintained a higher level of reactive silica in solution.

Although the invention has been described by reference to its preferred embodiment as is disclosed in the specification and drawings above, many more embodiments of the invention are possible without departing from the invention. Thus, the scope of the invention should be limited only by the appended claims.

What is claimed is:

1. A method of inhibiting silica scale formation, said method comprising the steps of: treating an aqueous system comprising silica with an effective amount of polymer comprising monomer A, monomer B, and monomer C, such that said polymer has the chemical formula:

wherein x=approximately 5 wt. %-approximately 45 wt. %; wherein y=approximately 55 wt. %-approximately 95 wt. %; wherein z=approximately 0 wt. %-approximately 25 wt. %;
wherein A is the repeat unit obtained after the polymerization of acrylic acid
wherein B is the repeat unit obtained after the polymerization of ethylene glycol methyl ether methacrylate
wherein C is the repeat unit obtained after the polymerization of one or more nonionic monomers selected from the group consisting of methacrylates, acrylates, and acrylamides.

2. The method of claim 1, wherein C is selected from the group consisting of methyl methacrylate, ethyl acrylate, hydroxy ethyl methacrylate hydroxy propyl acrylate and cellosolve acrylate, (meth)acrylamide, N-methyl acrylamide, N,N-dimethylacrylamide, N-isopropyl acrylamide, N-t-butyl acrylamide, N,N-dimethylaminoethyl (meth)acrylate, t-butyl acrylamide, t-octyl acrylamide and dimethylacrylamide.

3. The method of claim 1, wherein said polymer has a number average molecular weight between approximately 2000 Daltons and approximately 60000 Daltons.

4. The method of claim 1, wherein x=approximately 20 wt. %; and
wherein y=approximately 80 wt. %.

5. The method of claim 1, wherein said polyethylene glycol methyl ether methacrylate has a number average molecular weight of approximately 2,000 Daltons.

6. The method of claim 1, wherein said effective amount of said polymer is between approximately 0.5 ppm and approximately 1,000 ppm.

7. The method of claim 1, wherein said aqueous system has a temperature between 20° c and 25020 C.

8. The method of claim 1, wherein x=approximately 5 wt. %-approximately 30 wt. %; and wherein y=approximately 70 wt. %-approximately 95 wt.%.

9. The method of claim 1, wherein said aqueous system is selected from the group consisting of cooling water, desalination, filtration, reverse osmosis, sugar evaporators, paper processing, mining circuits, geothermal energy systems, SAGD systems, and silica brine.

10. The method of claim 9, wherein said aqueous system is said silica brine; and
wherein said bottle brush polymer inhibits the formation of colloidal silica without the formation of insoluble precipitates.

11. The method of claim 1, wherein C is methyl methacrylate; wherein x is approximately 7 wt. %; wherein y is approximately 72 wt. %; and wherein z is approximately 21 wt. %.

* * * * *

UNITED STATES PATENT AND TRADEMARK OFFICE
CERTIFICATE OF CORRECTION

PATENT NO. : 11,873,243 B2
APPLICATION NO. : 15/734096
DATED : January 16, 2024
INVENTOR(S) : Puspendu Deo et al.

It is certified that error appears in the above-identified patent and that said Letters Patent is hereby corrected as shown below:

In the Claims

In Column 12, Line 54, "25020 C" is replaced with -- 250° C. --

Signed and Sealed this
Third Day of September, 2024

Katherine Kelly Vidal
*Director of the United States Patent and Trademark Office*